F. J. MORAN.
PROTECTIVE COVER OR ARMOR FOR PNEUMATIC TIRES.
APPLICATION FILED FEB. 13, 1907.

913,752.

Patented Mar. 2, 1909.
2 SHEETS—SHEET 1.

Witnesses

Inventor:
Francis James Moran,
by Dodge and Sons,
Attys.

F. J. MORAN.
PROTECTIVE COVER OR ARMOR FOR PNEUMATIC TIRES.
APPLICATION FILED FEB. 13, 1907.
913,752.
Patented Mar. 2, 1909.
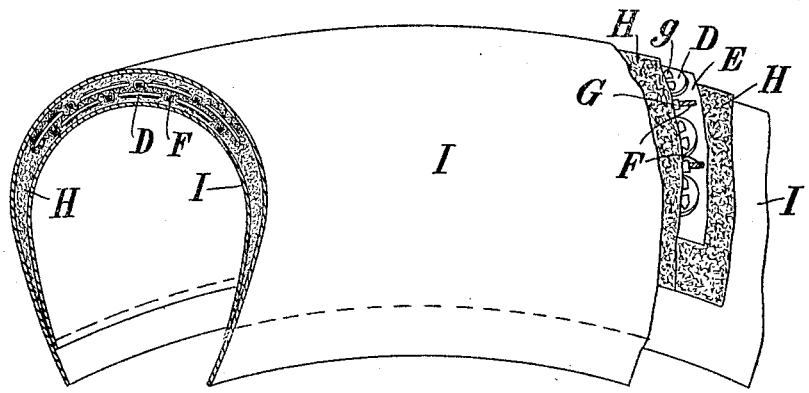
FIG. 8.
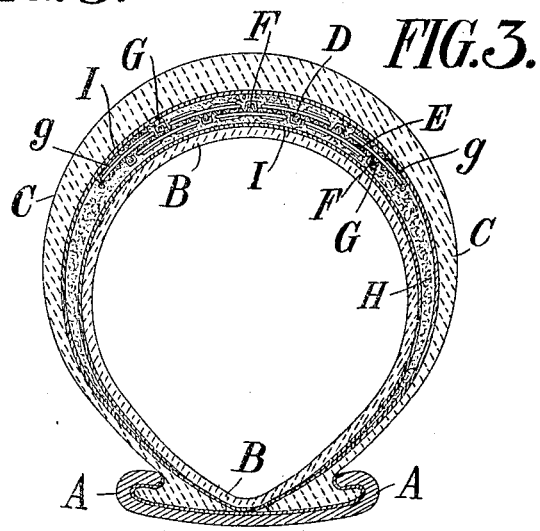
FIG. 3.
FIG. 4.
FIG. 5.

UNITED STATES PATENT OFFICE.

FRANCIS JAMES MORAN, OF BIRKENHEAD, ENGLAND.

PROTECTIVE COVER OR ARMOR FOR PNEUMATIC TIRES.

No. 913,752.　　　　Specification of Letters Patent.　　Patented March 2, 1909.

Application filed February 13, 1907. Serial No. 357,166.

*To all whom it may concern:*

Be it known that I, FRANCIS JAMES MORAN, a subject of the King of Great Britain, residing at Birkenhead, in the county of Chester, in the Kingdom of England, restaurant waiter, have invented certain new and useful Improvements in Protective Covers or Armor for Pneumatic Tires, for which application has been made in Great Britain, No. 2,146, dated the 28th day of January, 1907.

This invention has for its object certain improvements in protective covers or armor for pneumatic tires of that kind in which a series of disks or plates flexibly connected together are used.

Figure 1:
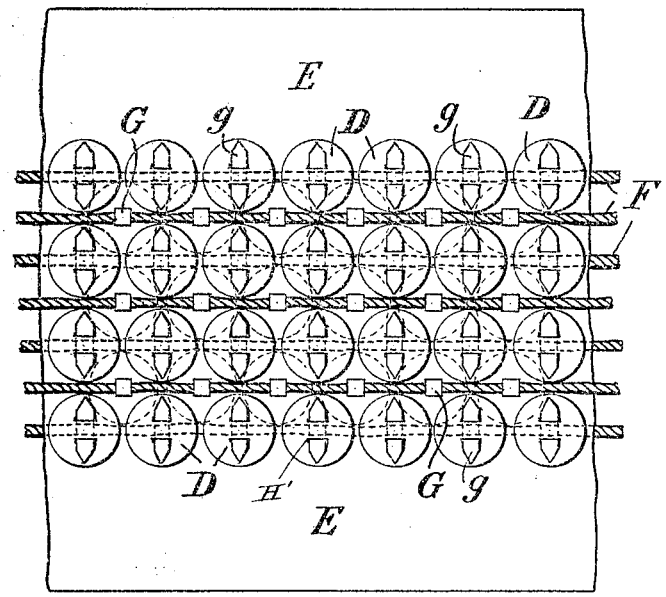
Figure 2:
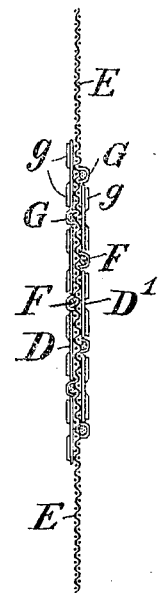
Figure 6:
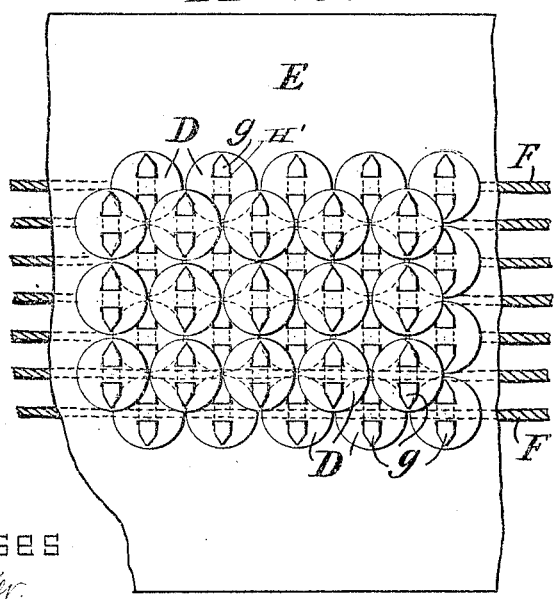
Figure 7:
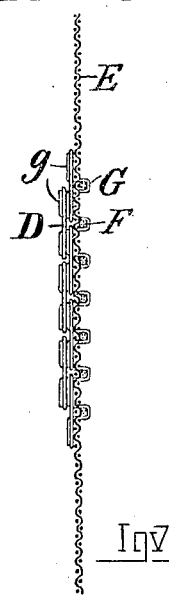

In the drawings, Figure 1 is a plan view of the protective armor; Fig. 2, a cross section; Fig. 3, a cross section of a tire complete embodying my invention; Fig. 4, a face view and cross section of one of the protective disks; Fig. 5, a plan view and edge view of one of the staples or fangs; Fig. 6, a plan view of the protective armor, with disks on one face thereof; Fig. 7, a cross section thereof. Fig. 8, is a view of a segment of the protective armor bent into the shape it assumes when in position.

Referring to Figs. 1 to 5 of the drawings, A is the wheel rim, B the air tube, C the outer cover of the tire which may be of any suitable construction. The tire is provided with an armor comprising disks D flexibly connected together by the base cloth or canvas E. This base cloth or canvas has pieces of cord F arranged in parallel lines at given intervals apart. The series of thin disks D are placed in rows on one face of the base canvas, so as not to touch one another. As therefore the disks D do not overlap there will be no grinding of the disks together, which is so liable to cause heat and friction, and prevent full flexibility being obtained. D¹, a series of similar thin disks placed in rows on the other face of the base canvas E, the layers on one side being arranged so as to break joint with those on the other. Thus they cover the entire area of the canvas, that is, every part likely to touch the ground, and yet none of the disks touch each other.

G are metallic staples having fangs *g*, and the disks are provided with holes H¹ for these fangs *g* to pass through. To attach the disks to the canvas, the metallic fangs are forced through the base canvas, one on each side of the cord F as far as they will go, that is, until the base of the staple binds against the cord and will go no further. The fangs are passed through the holes in the disks and their ends then bent down flat on the disks so as to hold the disks in place. The cords F which are arranged on both sides of the canvas keep the staples from breaking through the canvas. There are two series of staples, one passed through from one side of the canvas to hold the disks D and the other passed through from the opposite side to hold the disks D¹.

H are layers of felt or other suitable material on each side of the protective armor, to stop any rubbing against the inner tube B and the outer cover C. If desired a covering of asbestos or other fabric I, may also be used. This is so formed as to leave a pocket between the inner tube and outer cover, in which the felt and the protective cover are placed. This if made of asbestos acts as a heat insulator, and stops chafing against the outer cover and inner tube. The protective armor is made secure to the inside of the outer cover C by a good flexible solution such as indiarubber and solvents.

As the disks do not touch each other they have substantially no leverage, and the protective armor is perfectly resilient and will bend in any direction. The edges of the disks are rounded, so that when the tire is blown up there is no danger of their cutting the tire or air tube. The disks can be punched out of soft metal, or they can be of celluloid, horn, phosphor bronze, aluminium or any other suitable material, preferably somewhat flexible so as to conform to the shape of the tire.

In Figs. 6 and 7 I have shown the disks D, D¹, all arranged on one side of the base canvas E, with two series of disks breaking joint with each other, and the disks of each layer overlapping one another. The disks are secured to the canvas in the manner hereinbefore described. This is not in my opinion such a satisfactory arrangement, as in this case the disks are apt to grind against each other, and it is not nearly so flexible as the arrangement first described.

I declare that what I claim is:—

1. A protective armor for pneumatic tires, comprising a fabric base, cords arranged in lines on one face thereof, a series of disks arranged upon one face of the base, and staples straddling the cords and passing through the fabric and openings in the disks, the free ends of the staples being bent down flat against the disks.

2. A protective armor for pneumatic tires, comprising a fabric base, cords arranged upon opposite sides thereof in substantially parallel lines, a series of disks located upon each side of the fabric and between the cords, and a series of staples straddling the cords and passing through the fabric and through openings formed in the disks, the free ends of the staples being bent down flat against the disks.

3. A protective armor for pneumatic tires, comprising a fabric base, a series of cords arranged in parallel lines on each side of said base, the cords upon one side being out of alinement with those upon the other side, a series of disks arranged upon each side of the fabric, the disks occupying positions intermediate the cords, and a series of staples straddling the cords and passing through the fabric and likewise through holes formed in the disks, the free ends of the staples being bent down against the faces of the disks.

In witness whereof, I have hereunto signed my name this 28th day of January 1907, in the presence of two subscribing witnesses.

FRANCIS JAMES MORAN.

Witnesses:
WILLIAM HENRY WRIGHT,
WILLIAM HENRY GEORGE.